Jan. 9, 1923. 1,441,367
C. L. NORTON.
METHOD OF MOLDING BRICK SHAPES AND THE LIKE.
FILED FEB. 11, 1922. 2 SHEETS-SHEET 1
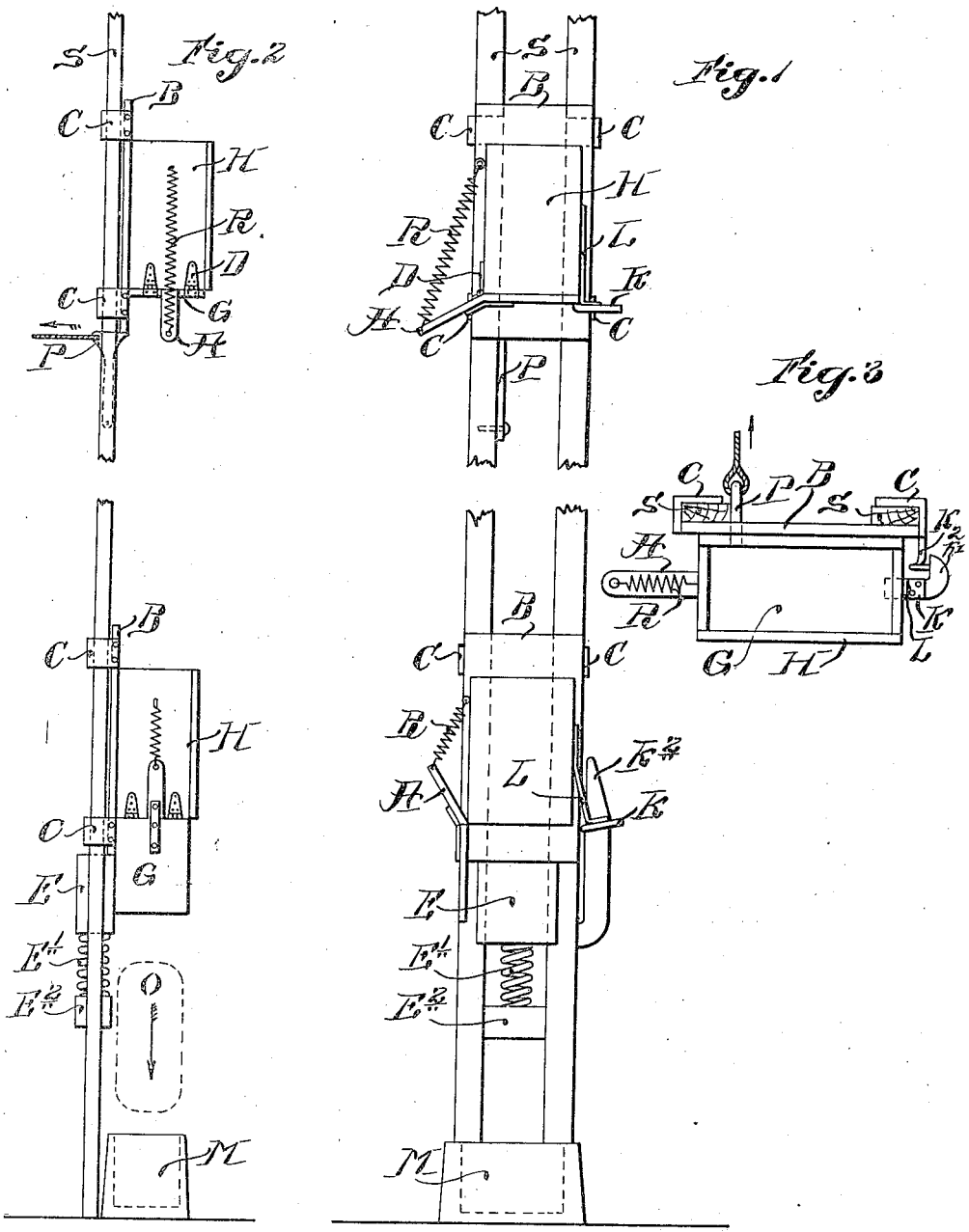
Inventor;
Charles L. Norton,
by Roberts Roberts & Cushman
his attys.

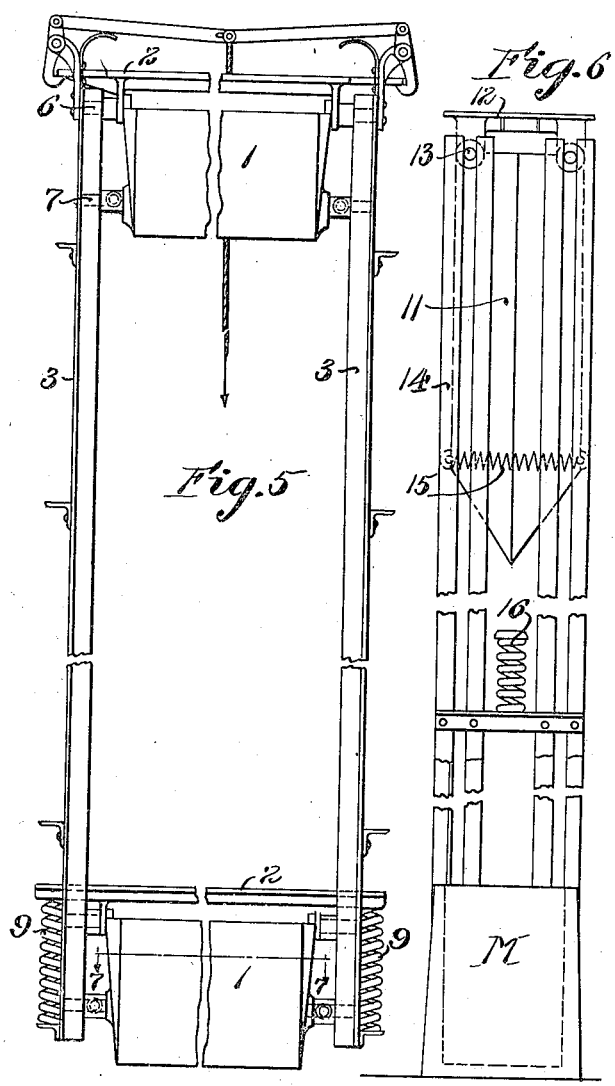

Patented Jan. 9, 1923.

1,441,367

UNITED STATES PATENT OFFICE.

CHARLES L. NORTON, OF NEWTON, MASSACHUSETTS, ASSIGNOR TO REFRACTORIES MACHINERY MANUFACTURING COMPANY, OF PITTSBURGH, PENNSYLVANIA, A CORPORATION OF PENNSYLVANIA.

METHOD OF MOLDING BRICK SHAPES AND THE LIKE.

Application filed February 11, 1922. Serial No. 535,733.

*To all whom it may concern:*

Be it known that I, CHARLES L. NORTON, citizen of the United States of America, and resident of Newton, in the county of Middlesex and State of Massachusetts, have invented new and useful Improvements in Methods of Molding Brick Shapes and the like, of which the following is a specification.

My invention relates to the manufacture of brick or other shapes, by molding, and is intended for service in particular with such materials as ground ganister and hard clays, which are unresponsive to moldingmethods adapted to more plastic materials. In my Letters Patent of the United States, Nos. 1,332,676 and 1,332,677, dated the second day of March, 1920, it is pointed out that such materials as ground ganister can be molded by projecting, as by dropping, a charge of the material under such conditions that on arrival at the mold its particles are arranged in a dense swarm, in which each particle is free from contact with its neighbors to such an extent that, though it be narrowly limited, this freedom enables the particles to move in relation to each other and fill the mold, into which they fall with force and emphasis. In applications for United States Letters Patent filed by me on the twenty-fourth day of May, 1921, Serial Nos. 472,244, and 472,245, it is further explained that the completeness with which a mold is filled by the mode described in the aforesaid patents is more fully assured, if the mold-charge liberated from an elevated hopper is slightly smaller in horizontal profile than the mouth of the mold which the charge is to fill, so that particles of material marginal in the descending charge will not be arrested and deflected from a straight trajectory into the mold. In the said applications it is explained also, that the conditions favorable for complete and accurate mold-filling by material of the gritty and refractory character under consideration, both as set forth in my said patents and in the said applications, are still further ensured, if the support, both vertical and lateral, afforded to the aggregate of particles forming the charge of material while it rests in the hopper, be withdrawn simultaneously and abruptly, so that the shape of the charge, imparted to it by the hopper acting as a matrix, shall be unaltered as little as possible. And, further, it is explained in my said application that, particularly for the purpose of filling large and irregularly shaped molds, it is advantageous to give the hopper, and therefore its charge, a downwardly pointing wedge-shape, so that the charge will enter the mouth of the mold, strike the bottom thereof first, and scatter explosively in all directions.

It may be noted here, that demonstrations and investigations made subsequently to the filing of my said applications have shown that a very acutely pointed falling charge of material, while well adapted to complete mold-filling, is liable to prove over-efficient, in that the emphasis of its initial impact strips the mold surface of the light sand-coating with which it is usually prepared, and drives the sand into the lateral regions or recesses of the mold, scouring parts of the mold surface bare, so that the brick shape is liable to stick there and be injured when removed from the mold. The values, and the principle of operation, of the wedge-shaped mold charge are conserved, and the incidental disadvantage of the acute wedge-shape removed, by blunting the lower end of the hopper, and therefore of the charges, or, in some cases by providing the bottom of the hopper with a shape which produces two or more salient points, thus distributing the impact and suppressing the scouring action.

The invention herein described is incremental and supplemental to those above briefly outlined. Its objects are to perfect, as far as possible, the liberation of the charge from the hopper without derangement of its shape; to adjust, with greater nicety than has heretobefore been possible, the degree of dispersion of the material constituting a mold charge, at the instant of entering the mold, and to provide means for increasing or decreasing the velocity of a mold charge as it enters the mold; and to reconcile low dispersion with high velocity. The dominant idea which is exemplified by several specific variations of apparatus and mode of operation in common, is: to cause both hopper and charge to fall together freely, and thus to accelerate the velocity of the charge while holding it undisturbed in the closed hopper, and at some predetermined point in the descent, to cause or to allow the hopper to open and set free the charge, and then to arrest the descent of the hopper, allowing the released charge to continue its course into the mold. The opening of the hopper and the arrest of its fall may be successive or simultaneous; for some purposes it appears to be preferable to open the hopper while it and the charge are accelerating as one, and are, relatively to each other, at rest, so that the opening movement is accompanied by practically no relative movement between these two objects in the gravitational direction; for other purposes it is effective to arrest the hopper and cause the force exerted by the moving charge itself to open the hopper, in such case possibly deranging to some extent the shape imparted to the charge by the hopper, but producing a jet of material from it which for some mold shapes, works well, provided the hopper be arrested fairly close to the mold. In other cases, especially where wide-mouthed molds of simple shape are to be filled, the arrest of the hopper and its opening movement may be effected simultaneously and with good result.

While the force of gravity constitutes effective means for imparting the desired velocity of movement to the charge, it is contemplated that, under some circumstances, as when using certain materials or mold shapes, it may be found desirable to employ some force other than gravity for producing the proper relative movement between the mold and the charge, from which it follows that the movement of the charge need not necessarily be in a vertical direction or even that the absolute movement of the charge be at all considerable as compared with that which may be imparted to the mold.

In the drawings hereto annexed, which illustrate my invention, and which show apparatus stripped of structural and contributory accessories as much as possible for the sake of exhibiting clearly the parts which are representative of the operating factors within my invention.

Figure 1 is a view in elevation (partly broken away) of a simple apparatus;

Figure 2 is a side view of the same;

Figure 3 is a plan view of the same;

Figure 4 is an end elevation of a more elaborate apparatus;

Figure 5 is a side elevation of the same; and

Figure 6 is an end view of a modification.

Figure 7 is a sectional plan view of the hopper of Figs. 4, 5 and 6.

Referring to Figs. 1, 2 and 3: A container or hopper H, consisting of an open ended box, is attached to a drop-board B. Clips C, C, hold the drop board B in sliding relation with the slides S, S. A movable latch, P, holds the hopper H in its upper position. The hopper bottom is closed by a swinging gate G, hinged at an edge at D, and held closed by the catch K, which is mounted on a leaf spring L, secured to the side of the hopper H. An arm A projects from the gate G, and spring R, secured to this arm and to the side of the hopper strains the gate to open.

At a determined point below the upper position of the hopper there is mounted the cam $K^2$, which is in place to engage the thumb $K'$ (Fig. 3) on catch K and draw the catch from under the gate G, as the hopper falls. A spring-abutment E, $E'$, $E^2$, is secured in such position that it will arrest the hopper board B and therefore the hopper, after the catch K has released gate G, and allowed spring R to jerk it open. Below this abutment the mold M is placed.

The container or hopper H, latched in its upper position, and with gate G caught closed, is filled with a mold-charge of granular material. Latch P is then withdrawn, and the charged hopper falls, until catch K is drawn by cam $K^2$, when the gate G snaps open. The charge does not fall out of the hopper at this instant, since hopper and charge are falling together. But presently the hopper board strikes the spring abutment at E, the hopper is arrested, and the hopper charge O (Fig. 2) shoots downward out of the hopper and into the mold M.

Suppose it were desired to project a charge of material into a mold at the velocity which would be attained after a vertical fall of one hundred feet. (This is a purposely extreme and probably impracticable case, but is exaggerated for purposes of illustration.) If a charge of granulated ganister were released at such a height, the particles, even if guided by a chute or tube, would on arrival at the mold be so scattered that the mold would not be filled. But, by protecting the charge, and conserving its shape and the close aggregation of its particles, by means of a hopper which falls with it, the desired extreme velocity can be acquired, and the charge released from the hopper so close to the mold that its particles arrive in the desired dense swarm.

It will now be obvious that a wide range of adjustments of conditions is made possible by the use of apparatus characterized by the factors above described in a very simple example. The slides S may be of any height desired. The releasing cam $K^2$ may be placed at any point between the abutment E, $E'$, $E^2$ and the upper lodgment of the hopper. The abutment E, $E'$, $E^2$ may be spaced as desired in relation to the releasing cam $K^2$ or the mold M, or both. A selected velocity, at the instant of release from the hopper, will afford any desired degree of dispersion of granules, according to the distance through which the released charge O is to fall freely and without the protecting envelope of the hopper, and, by selecting the height of the starting point of the hopper, any desired emphasis of impact by the charge upon the mold surfaces can be secured.

With the foregoing explanation of the apparatus shown in Figures 1, 2 and 3, in the reader's mind, a very brief description of Figs. 4, 5 and 6 will suffice.

In Figs. 5 and 6, there is shown a falling hopper with mechanical adjuncts which open and arrest the hopper simultaneously. The hopper is of the "clam shell" type, composed of two similar halves 1, 1, each pivoted by a pin 6 on a frame 2; each also carries a pin 7. Pins 6 and 7 travel in slides 3, and, when the two pins of each half of the hopper are in the straight vertical portions of the slides, the hopper will be closed. Each slide diverges at the bottom, at 5. A spring 8 is stretched between pins 7, 7. A spring abutment at 9 may be provided, to be encountered by the projecting ledge of the frame 2. The mold M is placed below the hopper. The hopper is shown in full lines in both its upper and lower positions.

The container or hopper being held in its elevated position, it is charged with material, and allowed to fall. Hopper and charge fall together and exert no force on each other (appreciably) during their fall. When pins 7 reach the divergent portions 5 of the slides, the halves of the hopper are opened, and the charge O released. Spring 8 cushions the shock of the hopper, and spring abutment 9 contributes to this cushioning effect. The cushioning springs should be so adjusted that the mechanism of the hopper shall not be unduly wrenched by its arrest.

Any variety of hoisting mechanism may be employed to restore the hopper to its elevated position. The cycle of operations will resemble that of a pile-driver.

Referring now to Fig. 6; the hopper is here again of the "clam-shell" type, but deep, with a pointed nose. Its two halves 11, 11 are pivoted on pins 13, 13, to a frame 12, and are held together by a spring 15, the function of which is, chiefly, to hold the hopper closed while it is filled, and during its descent. Slides 14 guide the hopper by means of the pins 13, which run in the slides. An abutment 16 is placed where it will arrest the frame 12 and therefore the hopper.

The container or hopper 11, 11, being held elevated, it is charged with material, and let fall. When the hopper is arrested by the abutment 16, the momentum of the charge pushes aside the pivoted halves of the hopper against the stress of the spring 15, and shoots it in a jet to and into the mold M.

The apparatus above described is the subject matter of claim in an application for United States patent, filed by me concurrently herewith, serially numbered 335,732.

I claim:

1. That method of forming molded shapes which comprises projecting a dense swarm of discrete particles toward an open mold cavity, positively confining said swarm of particles within definite bounds during the early portion of its path of movement, and relieving the mass from such confinement prior to its entrance into the mold cavity.

2. That method of forming molded shapes which comprises impelling a mass of discrete particles toward an open mold cavity while restraining the several particles against substantial relative movement, and suddenly relieving said particles of such restraint at a determinate distance from the mold cavity.

3. That method of forming molded shapes which comprises confining a mold-charge both laterally and vertically, moving such mold-charge, while so confined, toward an open mold, releasing such charge from confinement, both lateral and vertical, without substantially decreasing its velocity of movement, and permitting the unconfined charge to enter the mold.

4. That process of forming molded shapes which comprises associating a multitude of discrete particles to form an aggregate of definite shape, projecting such aggregate toward an open mold while positively restraining such aggregate from substantial deformation, and relieving such aggregate from all restraint as to shape prior to its entrance into the mold.

5. The method of molding brick-shapes and the like, characterized by confining a mold-charge, allowing the mold-charge to fall while still confined, releasing the mold-charge from its confinement while in course of descent, and arresting the mold-charge in a mold.

6. The method of molding brick-shapes and the like, characterized by confining a mold-charge, allowing the mold-charge to fall while still confined, releasing the mold-charge from its confinement without substantially altering its acceleration while in course of descent, and arresting the mold-charge in a mold.

7. That process of forming molded shapes which comprises confining a mold-charge within an openable container, projecting such container with its charge toward an open mold, and causing such container to open and to discontinue its movement whereby the charge is ejected from the container and permitted while unrestrained to enter the mold.

8. That method of forming molded shapes which comprises placing a mold-charge within an openable container, impelling such container with its charge at a constantly accelerated velocity toward an open mold, opening said container while it, with the charge therein, are accelerating uniformly and are relatively at rest, and arresting the movement of the container at a determinate distance from the mold.

9. That process of forming molded shapes which comprises placing a mold-charge within an openable container, projecting said container while closed toward a mold, opening said container while the charge and container are moving at substantially the same velocity, and suddenly arresting the movement of the container at a determined distance from the mold.

Signed by me at Boston, Massachusetts, this seventh day of February, 1922.

CHARLES L. NORTON.